Nov. 2, 1943.   I. COWLES   2,333,470
COUPLING FOR METAL TUBING
Filed Oct. 23, 1942
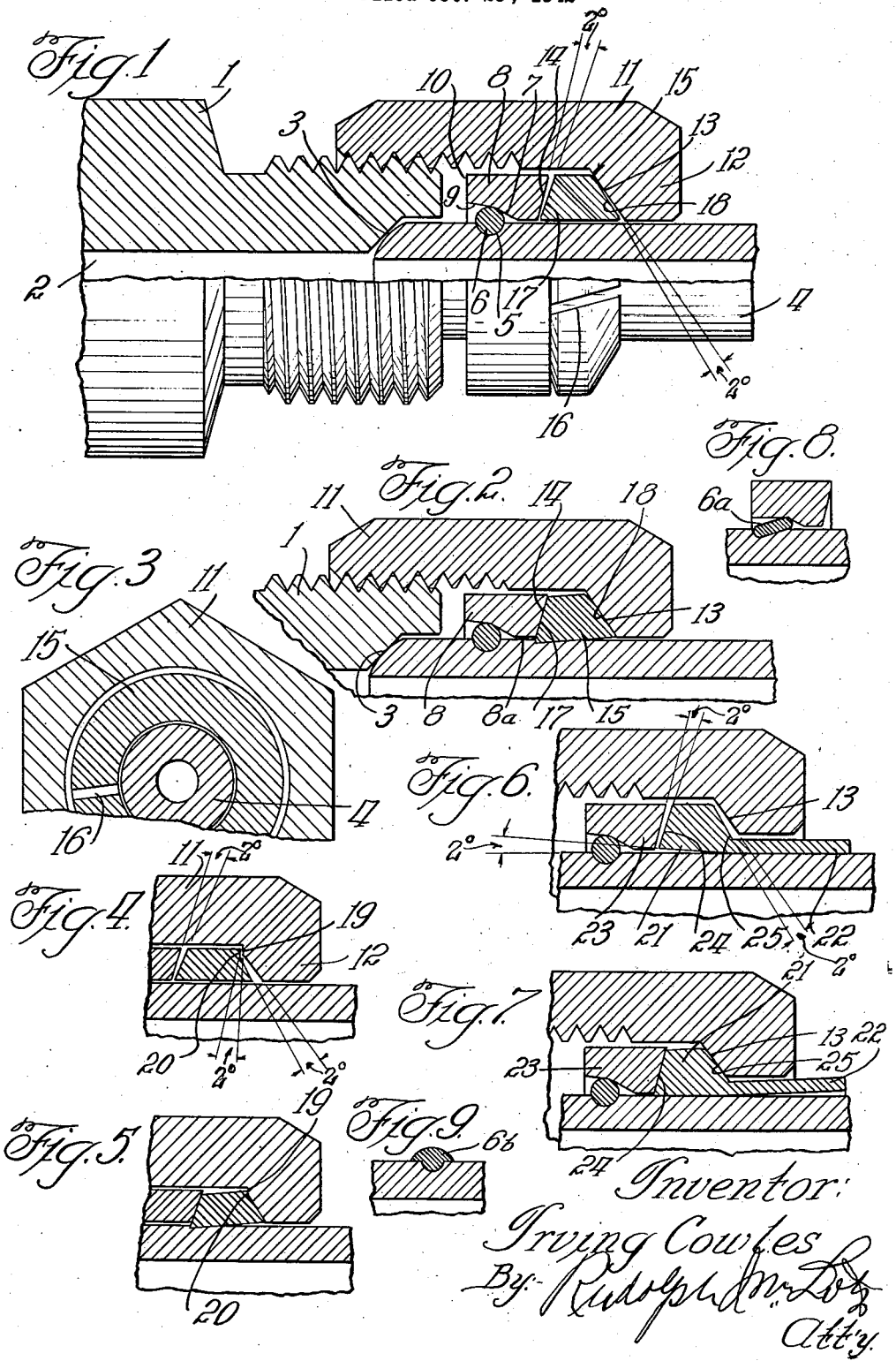
Inventor:
Irving Cowles
By Rudolph M. Lee
Atty.

Patented Nov. 2, 1943

2,333,470

UNITED STATES PATENT OFFICE 2,333,470

COUPLING FOR METAL TUBING

Irving Cowles, Detroit, Mich., assignor to Rudolph W. Lotz, Chicago, Ill., and himself as successor cotrustees of Utilities Patents Trust Application October 23, 1942, Serial No. 463,033

12 Claims. (Cl. 285—87)

This invention relates to couplings for metal tubing of types used for very high pressure fluid transmission purposes and composed of either hard or soft metal, but which is not intended or adapted to be provided with threads nor with the flared flanges common to low pressure soft metal tubing.

The instant coupling is designed for hard metal tubing and for tubing of the type used in Diesel type engines. The Diesel engine tubing is usually composed of soft metals, such as soft steel, alloys of soft metals, etc., and has very small diameter ducts compared with the great thickness of walls thereof, and is subjected to pulsating high-pressure stresses and intense vibration stresses which act to cause crystallization of the metal and consequent fractures, the latter occurring most commonly at certain critical points in the conduits composed of such tubing and couplings.

Heretofore, as far as I am informed, it has been and still is customary to cut this soft metal tubing into given lengths and upset the end portion thereof in a conventional manner, to provide heads at both ends of each tube which present annular shoulders for engagement with sleeve nuts and provide seat formations which are held upon seats of fittings by the said nuts. In this upsetting operation, hardening of the metal acted upon occurs, and this hardening promotes crystallization of the tubes adjacent the upset ends under the influences of the various stresses to which the tube is subjected in use.

In mounting the tubes in place, the upset head end portions thereof are engaged by the inturned flanges of the coupling nuts engaged with companion coupling elements or fittings, such as elbows, T's and the like, for holding the tube ends upon the seats of the said fittings. The said vibration and tensile stresses concentrate at the junctions of the heads with the body portions of the tubes and cause crystallization and fracture at these points.

The cutting to lengths and upsetting of the ends of the tubes, done while they are straight, necessitates disposing the sleeve nuts upon the tubes prior to the second upsetting operation. Almost every such tube is then bent to a predetermined contour and the bending operations are rendered difficult because the nuts interfere with them. As enormous numbers of every shape and size of such tubes are manufactured in every factory that makes them, this interference adds to cost.

However, the greatest disadvantage of tubes equipped with upset ends is found in the fact that, following a fracture, the tubes must be replaced by a new one, since reshaping and upsetting operations cannot be performed in the field or on ships, and, therefore, a stock of extra tubes has to be on hand wherever Diesel-type engines are used. The life of such tubes, which are very expensive, varies greatly so that, in a long journey, several replacements may be required and the stock on hand of new tubes exhausted at a critical time with disastrous results, because to effect competent repair requires a highly skilled and experienced mechanic to upset another head on a broken tube by manual operation and takes no less than five to six hours.

In the case of other high-pressure tubing composed of hard metal but which is of thin-walled type incapable of being threaded, it is desirable to provide couplings of a type which may be removed and replaced with ease and dispatch and which are of a nature which will permit of quick repair in event of any fracture.

The problems presented by the hard metal and Diesel-type engine tubes are parallel with respect to avoidance of any weakening thereof and the provision of means for effecting quick repairs and also preventing the aforesaid concentration of stresses on very vulnerable points in the tubes.

It is desirable, therefore, that means be provided to prevent such loosening of nuts without resorting to the use of lock nuts or other special means commonly used for that purpose, especially because compactness, neatness of appearance of couplings, minimum weight thereof and lowest possible cost commensurate with provision therein of means essential to the safety factors therein (which are provided by the coupling of the instant invention) are essential.

The use of the types of tubing aforesaid in Army and Navy equipment, including all classes of combat air-craft, is very extensive, so that safety factors included in the requisite couplings cannot be overestimated as to their importance.

The objects of the instant invention are:

1. To provide coupling means which will not loosen under the combined influences of temperature changes, vibration, or other stresses to which the tubes and couplings are subjected.

2. To provide coupling means of the above type which include means whereby the vibration and other stresses on the tubes are so diffused or absorbed at or adjacent to points of engagement thereof, which are spaced from the seat end and requisite to maintain the tube ends seated against leakage, as to decrease materially the danger of fractures of the tubes and thus increase the life thereof proportionately to the decrease of danger of fractures.

3. To provide coupling means for tubes of the types specified which are very compact, light and simple in construction and capable of being manufactured at low cost as well as obviating the necessity of upsetting the tube ends as aforesaid, and which are easily detachable and replaceable for re-use.

4. To provide coupling means possessing the aforesaid advantageous characteristics which, in connection with suitable simple manually operable tools, will enable quick repairs and replacements of tubes to be made in the field by relatively unskilled persons.

(The tools last referred to will constitute subject matter for a separate application for Letters Patent.)

5. To provide coupling means wherein the component parts are self-aligning and self-centering.

6. To provide coupling means which may be mounted in place after the tubes have been bent to desired contour.

7. To provide coupling means which allow of trimming of the seat ends of the tubes to correct any fault therein due to scoring and the like, without requiring detachment of the couplings therefrom.

Suitable embodiments of the invention are illustrated in the accompanying drawing, wherein:

Fig. 1 is a fragmentary diametric sectional view of a tube of the type specified equipped with a coupling constructed in accordance with the invention, with the component parts of the coupling shown in their normal relative positions.

Fig. 2 is a view similar to Fig. 1 and wherein the component parts of the coupling are shown in the relative positions wherein the seat end of the tube is fully compressed upon the seat of the seat member of the completed conduit.

Fig. 3 is a transverse sectional view taken on the line 3—3 of Fig. 1.

Figs. 4 and 5 are fragmentary detail sectional views of the sleeve nut and contained parts showing a slightly modified type of structure, wherein Fig. 4 shows the parts in their relative positions before the nut is tightened and Fig. 5 shows them in their relative positions when the nut is tightened.

Figs. 6 and 7 are views similar to Figs. 1 and 2, respectively, but wherein the male member of the conduit is omitted from illustration.

Figs. 8 and 9 are fragmentary detail radial sectional views of the tube and unsplit sleeve of the coupling and illustrate modified forms of construction of the split rings engaged in annular recesses of tubes.

The coupling comprises the male member 1 which may be integral with the engine or equipped with a pipe thread nipple to engage threaded openings in the engine base and other parts of the engine.

The male member 1 is threaded externally in the instance illustrated, and provided with a bore 2 bordered by a seat 3 for a seat end of the tube 4.

Preferably, the seat 3 presents a conical surface, and the seat end of the tube 4 a sphero-convex surface, so that initially it engages said seat 3 along an annular line which may be converted into a relatively narrow flat annular surface by the pressure exerted upon said opposed seat surfaces to effect a fluid-tight association thereof.

At a point spaced from the seat end of the tube 4, the latter is provided with an annular groove which, in the instance illustrated, is arcuate in cross section on an arc of less than 180° and of radius equal to that of the wire of which the split collar 6 is composed, so that the latter will fit said groove very snugly.

The purpose of so limiting the depth of the said groove 5, as above described, is to prevent any undue weakening of the tube 4 at this point and consequent rupture thereof responsively to high internal pressure.

The arcuate length of the split collar 6 is such that its ends almost meet when the same is contracted to its limit by the annular inclined shoulder 7 of the sleeve 8 which is disposed telescopically upon the tube 4 before the said collar 6 is mounted upon the latter. The taper of said shoulder 7 is on an angle of such degree that, while it acts to contract the collar 6, it cannot exert enough pressure thereupon radially to effect any contraction of the tube 4 to reduce the diameter of its duct. The said shoulder 7 merges into the slightly tapered bore 9 of the skit portion 10 of the sleeve 8 which is of only slightly larger maximum diameter at its junction with said shoulder 7 than the outer diameter of the collar 6 when the latter is fully contracted. Said bore 9 acts to effect initial contraction of the split collar 6 prior to engagement thereof by the shoulder 7 and also acts to prevent escape of the said collar from the sleeve 8.

Thus the collar 6, in cooperation with the sleeve 8, would act, except for preventive means, to cause or permit the concentration of vibration stresses along the annular groove 5 at the upper edge of the latter, and which would probably extend to the bottom of said groove and thus to the weakest point in the same and cause crystallization and fracture of said tube at this weakest point.

The sleeve 8 is cylindrical externally and fits loosely the bore of the sleeve nut 11. The latter is threaded along one end portion to engage the threads of the male member 1 and is equipped at its other end with an inwardly projecting annular surface or shoulder 13 having a tapered inner face.

The outer end of the sleeve 8, which is unsplit, presents a tapered annular shoulder 14 which is of greatest depth where it meets the cylindrical bore portion 8a of said sleeve. Said bore 8a is of the smallest permissible diameter for permitting free passage therethrough of the tube 4.

Interposed between the flange 12 and the outer end of the sleeve 8, is a split sleeve 15 of a resilient metal, which is normally cylindrical externally and internally and is equipped with a single slot 16 extending from end to end thereof. The outer diameter of said split sleeve 15 is substantially equal to that of the sleeve 8 while its bore is of substantially the same diameter and is only slightly greater than the outer diameter of the tube 4.

The end of the split sleeve 15 opposed to the end of the sleeve 8 presents an annular surface or shoulder 17 of slightly different and steeper taper than the end surface or shoulder 14 of the sleeve 8, so that it meets the said shoulder 14 first along the deepest portion of the latter whil the outer edges of the said shoulders 17 and 14 are spaced from each other.

Similarly the outer end of the split sleeve 15 presents a tapered surface or annular shoulder 18, opposed to the shoulder 13 of the flange 12 of the nut, and is less steeply tapered than said shoulder 13 so that the outer edges of said shoulders 13 and 18 are the first to meet as the nut 11 is rotated to move the shoulder 13 toward the male member.

The taper of the shoulder 14 of the sleeve 8 is at an angle of substantially 78 degrees in the instance illustrated, while the taper of the shoulder 17 of the split sleeve 15 opposed thereto differs therefrom to the extent of about two degrees, more or less. The same difference in degree of taper of the opposed shoulders 13 and 18 is adhered to as the difference between the tapers of the shoulders 14 and 17.

The purpose of differences in taper of the respective pairs of opposed shoulders 14—17 and 13—18, described above, is to cause pressure exerted upon the split sleeve along the outer edge of its outer end, to be directed toward the smallest diameter portion of its inner end and thereby, in cooperation with the shoulder 14, to cause the lower end of the split sleeve to be subjected to far greater contracting force than its upper end. A further purpose of this difference in degree of taper of said opposed pairs of shoulders, is to reduce to a minimum the tendency of the split sleeve 15 to rotate with the nut 11 and also to minimize the tendency of the unsplit sleeve 8 to rotate with the split sleeve 15 in the event that the latter does rotate with the nut, because such rotation of the sleeve 8 would impose torsional stress upon the tube 4 via the split collar 6.

By reason of the thickness of the split sleeve 15, the latter offers a high degree of resistance to contraction and that resistance naturally causes the pressure upon said split sleeve 15 to be transmitted to the unsplit sleeve 8 and, by the latter, to the split collar 6 and thereby to the tube 4 to force the latter to its seat with appreciable pressure which increases as rotation of the nut 11 progresses.

As said progressive rotation of the nut 11 continues, the difference in angles of taper of the opposed pairs of shoulders aforesaid, decreases, because the slot 16 of the split sleeve 15 contracts to a continuously greater degree at the inner end of said sleeve than at the outer end thereof and thus the bore of said sleeve becomes tapered slightly instead of remaining cylindrical. Thus, the lower sharp edged end of said split sleeve 15 is contracted to a diameter slightly less than that of the tube 4 and bites into the same to a predetermined degree without, however, effecting any contraction of the duct of said tube under the greatest degree of pressure that the nut 11 is capable of exerting without stripping its thread connection with the male member 1.

The angles of the several tapered shoulders 13—18 and 14—17 to the axis of the nut 11 and tube 4 are determined first, by the degree of pressure which the lower end of the split sleeve is desired to exert upon the tube 4 under maximum pressure of the nut 11 with respect to biting slightly into the tube 4 and yet limiting that radial pressure so that the tube 4 cannot be contracted responsively thereto and thus contract the duct thereof; and second, to cause the respective pairs of shoulders, last referred to, to meet over the entire areas of the opposed surfaces thereof as soon as the contraction of the split sleeve 15 has attained the limit aforesaid.

Since that contraction is resisted by the tube 4 to a progressively increasing degree from the instant that the lower end of the split sleeve 15 obtains a hold upon the tube to the instant that it has bitten into the tube to a predetermined depth, the last-named limit of contraction is attained before the slot of the split sleeve 15 is closed at said lower end.

The angle of taper of the shoulder 13 is such that it is incapable of exerting a sufficient radial pressure on the upper end of the split sleeve 15 to act to contract the same so that the action of the surfaces 13 and 18 during rotation of the nut is equivalent to a relative pivotal movement about the initial annular line contact thereof as a fulcrum.

In the instant structure, the tapered shoulder at the outer end of the sleeve 8 extends at an angle of about fifteen degrees to a plane perpendicular to the axis thereof while the taper of the end of the sleeve 15 opposed thereto is at an angle of seventeen degrees to said plane.

The taper of the surface 13 of the nut flange 12 is at an angle of thirty-five degrees to said flange while the taper of surface or shoulder opposed thereto is at an angle of thirty-three degrees to said plane.

The initial movement of the split sleeve 15 is axial until it is pressed firmly against the sleeve 8. Then said sleeve 15 becomes cupped so that the taper of its bore to maximum degree is attained against the resistance of the tube 4, as aforesaid. Thereafter, any further longitudinal movement of the sleeve 15 is again parallel with the axis of the tube 4, but such further movement, if any, is microscopic in degree.

The purpose of bringing said opposed shoulder surfaces into full area contact at the instant that the desired degree of bite into the tube 5 has been attained, as above described, is to assure, by friction, a maximum degree of resistance to reverse rotation of the nut 11 and thus prevent loosening of said nut under the combined influence of vibration and temperature changes, which constitute the main, if not the only causes of loosening of nuts otherwise than by manually exerted force applied thereto.

In the instant structure the force required to effect reverse rotation of the nut is substantially equal to that required to cause said opposed pairs of shoulder surfaces to meet and become clamped against each other in the final rotation of the nut. The resistance to such forced reverse rotation decreases only slightly progressively through a relatively long arc of applied wrench-force before the fluid-tight association of the tube seat and the male member seat is broken to the degree that leakage will occur under the maximum fluid pressure within the tube.

The importance of this resistance to loosening of the nut cannot be overestimated, because couplings of the type to which the invention relates are used in very high pressure hydraulic controls as well as in Diesel-type engines and also on gasoline lines of other types of internal combustion engines. Leakages in any thereof are not only dangerous, but are apt to be disastrous.

By causing the split sleeve 15 to grip the tube 4, as described above, the portion of the tube between said sleeve 15 and the seat end thereof is relieved of tensile and vibration stresses.

The cupping of the split sleeve 15, to cause its bore to become slightly tapered, acts to diffuse vibration stresses on the free portion of the tube 4 between couplings and thus prevents crystallization and fracture thereof for a far longer period than usual and thus lengthens the life of the said tube very materially.

It will be noted that a free space is left between the end of the unsplit sleeve 8 and the opposed end of the male member 1. This constitutes a take-up space which permits the cutting away of the seat end of the tube to provide a new surface in the event that the prior existing surface shall have been scored or distorted or not properly shaped to become firmly seated upon the seat of the male member. This space acts similarly in the event of reaming out the male member seat to correct any inaccuracies therein.

Figs. 4 and 5 illustrate a slight modification in construction wherein the inner inclined face 13 of the flange 12 of the nut 11 is bordered by a flat surface 19 which is perpendicular to the axis of said nut.

In this structure, the opposed end of the split sleeve 15 is equipped with an outer annular surface portion or shoulder 20 which is inclined reversely to the remainder of the surface 18 and extends normally angularly to the surface 19 to the same degree as the surfaces 13 and 18 extend to each other.

In this modified structure the perimeter of the surface 20 fulcrums on the surface 19 during tightening of the nut as the other end portion of the split sleeve 15 contracts as above mentioned, and acts to prevent positively any contraction of the outer end of said sleeve 15.

During and after contraction of the latter at its inner end portion, until the tube 4 is engaged, the perimeter of the shoulder 20 cannot become disengaged from the surface 19 because it would have to swing inwardly on an arc having its axis at the meeting point of the lower end of the sleeve 15 and the tube 4 and said arc intersects the surface 19 as shown in Fig. 4. When the nut is tight, the surfaces 19 and 20 and 13—18 are disposed in close contact over their entire opposed areas, as shown in Fig. 5.

It is well known that thread connections between male members and nuts of couplings do not act necessarily to cause said members to become axially aligned. The axes thereof may be slightly inclined to each other as well as slightly eccentric to each other. In order to assure that the sleeves 8 and 15 of the instant coupling become axially aligned when the nut 11 is tight, an ample free annular space is provided between said sleeves and the bore of the nut 11 to compensate for the lack of axial alignment of the latter with the male member, said lack of alignment being remedied almost entirely when said nut is tight, by cooperation of the several pairs of inclined surfaces above described, because the interengaged threads of the nut and male member are usually loose enough to permit this correction in which the tube 4 plays an important part in cooperation with the split collar 6 and the split sleeve 15.

Besides producing the aforesaid results, the instant structure prevents vibration stresses from reaching the weakest portion of the tube 4, and by reason of the ultimate slight taper of the bore of the split sleeve, the vibrations to which the tube 4 is subjected are so diffused within said split sleeve as to be substantially absorbed therein and thus prevents the crystallization of said tube along the bite of the split sleeve into the same, the life of the tube being thus greatly increased. The latter is very important at all times and critically so at this time.

Another function of the aforesaid bite into the tube 4, and the vise-like hold of the split sleeve upon the tube 4, is to relieve the weakest portion of said tube of tension stresses to which the high pressures within the latter subject the same and which are vastly greater under conditions found in Diesel-type engines (wherein such pressures are of the aforesaid pulsating nature and vary from about zero to the maximum of many thousands of pounds per square inch as frequently as five thousand per minute). Thus pulsating force is somewhat equivalent to trip-hammer action and plays a very important role in wrecking the tube 4; more so than in engines of other types.

The purpose of providing the tapered shoulder within the unsplit sleeve 8, engaging the splitwire ring 6, is to prevent shearing of the latter under the force of tightening of the nut. That force is great and is taken into full account in the instant structure, which presents, in a single, simple very compact and inexpensive embodiment of the invention, all of the factors essential to safety and long life which are now scattered into the art, because other couplings present only one or two of such factors each, as opposed to the total of five such essentially requisite safety features combined in the single structure.

In the structure of Figs. 6 and 7, the split sleeve 21 includes a tail portion 22 which is very thin compared with the main or head portion thereof and may be of any desired length.

In this structure the bore of the tail portion 22 is normally cylindrical while the bore of the head portion 21 is normally slightly tapered. The degree of that taper must conform to the difference in degree of the tapers of the opposed pairs of shoulders of the unsplit sleeve 23, the end and intermediate shoulders 24 and 25 respectively of the split sleeve 21—22, and the inner shoulder 13 of the nut 11, so that when the last-mentioned shoulders meet, the bore of the head portion 21 will be cylindrical and will have a very powerful vise-like hold upon the tube 4 throughout the length of said last-named bore portion, while the bore of the tail portion 22 is then tapered slightly and is of largest diameter at its outer extremity.

In order that this vise-like hold of the head portion 21 upon the tube 4 may be attained, the degree of taper of the shoulder 14 of the unsplit sleeve must be more sharply angular to the axis of the coupling than is shown in Figs. 1 and 2 by from five to ten degrees.

This difference in taper will apply also to the shoulders 24 and 25 of the split sleeve 21—22, and the shoulder 13 of the nut 11, so that the latter will exert a sufficient force radially upon the outer shoulder 25 of the sleeve 21—24 to effect the same or substantially the same contractive force as is applied to the lower end of said portion 21.

The difference in degree of the last-mentioned opposed pairs of shoulders must be such that as soon as the bore of the portion 21 becomes cylindrical, the opposed surface areas of said opposed shoulders will be in full contact with each other. Further rotation of the nut after this has occurred will have no other effect than to increase the tenacity of the hold of the split sleeve portion 21 upon the tube 4 and to effect further movement of the same toward the male member. But by the time said shoulder areas are in full contact with each other, the nut 11 will have attained the normal wrench-responsive position intended (which is commonly expressed in pounds of pull) to be exercised by the mechanic upon the handle of the wrench of given size selected for the purpose.

The selected degree of taper of surfaces and bores, as applied to the structure of Figs. 6 and 7, must be such that it will render impossible the application of enough contractive force upon the split sleeve portion 21 to cause the latter to contract the tube 4, the length of the hold upon the latter being also a determining factor to limit the pressure exerted upon said tube. The differences in such tapers must be common or substantially so, with respect to all opposed surfaces to be brought into full area contact during rotation of the nut 11 and may be as low as one degree and, preferably, not more than two and one-half degrees.

In Fig. 8 there is shown a truncated cone-shaped split ring 6ᵃ and a correspondingly shaped annular groove in the tube 4 to receive the same in substitution for the groove 5, the ring 6ᵃ being adapted to offer greater resistance to shearing than the split-ring 6 shown in Figs. 1 and 2.

In Fig. 9, the split ring 6ᵇ constitutes a substitute for the ring 6 of Figs. 1 and 2 and acts to reinforce the tube 4 beyond the groove 5 and add to the frictional resistance to movement of the tube away from its seat, which the split sleeve 15 of Figs. 1 and 2 or the split sleeve 21 of Figs. 6 and 7 provides.

I claim as my invention:

1. An all metal conduit comprising a tube, a coupling member equipped with a seat for an end of said tube, an annular removable collar on said tube adjacent said end, an unsplit sleeve disposed upon the tube in engagement with said collar and equipped at one end with means to prevent detachment of said collar from said tube, the other end of said sleeve equipped with a conical recess, a sleeve nut having thread engagement at one end portion with said coupling member and at its other end with an inturned flange, and a resilient split sleeve interposed between said flange and said recessed end of said unsplit sleeve for transmitting pressure of said flange thereon to said unsplit sleeve and through the latter to said collar to maintain the tube seated, said split sleeve equipped with tapered surfaces opposed to said conical recess and to the said flange respectively, and said flange having a tapered surface opposed to one of said surfaces of said split sleeve, said respective opposed pairs of tapered surfaces maintaining said split sleeve contracted upon the tube for resisting the unseating of the latter independently of said collar and unsplit sleeve.

2. A structure as defined in claim 1, wherein the split sleeve is equipped with a bore of a given shape prior to contraction thereof and wherein the shape is changed by contraction of said sleeve and engages the tube with a clamping action as the tube is firmly seated and presents a tapered bore portion about the tube along the outermost portion of the split sleeve wherein vibration stresses on the free portion of the tube are diffused.

3. A structure as defined in claim 1 wherein the bore of the split sleeve is normally cylindrical and wherein the same is tapered when said sleeve is contracted to engage the tube to cause the end thereof engaged in said conical recess of said unsplit sleeve to be contracted to greater degree than its other end when said tube is firmly seated.

4. A structure as defined in claim 1 wherein the bore of the split sleeve is normally cylindrical and is rendered tapered by end pressures thereon so that the end thereof engaged in said conical recess of the unsplit sleeve is flexed to smaller diameter than and bites into the tube while the remainder of said bore is progressively farther spaced from the tube when the latter is firmly seated.

5. A structure as defined in claim 1, wherein the taper of the end surfaces of the split sleeve differ from the surfaces opposed thereto so the end surface engaged in the conical recess of the unsplit sleeve is engaged only along the bore of the said sleeve with said opposed surface and the other end surface is engaged only along its periphery with the flange of said nut when the latter is loose, and wherein the tightening of the nut causes the first-named end of the split sleeve to be contracted to cause it to bite into the tube, while the remainder of said split sleeve is contracted to a progressively less degree and causes the bore of said sleeve to be spaced progressively farther from the tube when the latter is firmly seated.

6. A structure as defined in claim 1, wherein the split sleeve is equipped with a bore of a given shape prior to contraction thereof and wherein the shape is changed by contraction of said sleeve and engages the tube with a clamping action as the tube is firmly seated and presents a tapered bore portion about the tube along the outermost portion of the split sleeve wherein vibration stresses on the free portion of the tube are diffused, and wherein the ends of the split sleeve and the surfaces opposed thereto are in contact with each other over greater area when said tube is firmly seated than when the nut is loose.

7. An all-metal conduit including a metal tube and a coupling therefor, the latter comprising a seat member for an end of the tube, a sleeve nut having thread engagement at one end with the seat member and equipped at its other end with an inturned annular flange provided with an inner tapered surface, a removable split collar engaged in an annular groove adjacent the seat end of the tube, an unsplit sleeve disposed over the tube and rotatable and longitudinally movable within the nut, a skirt portion at one end of said sleeve disposed about and retaining the collar engaged in said recess and terminating in an annular shoulder engaged with said collar for forcing the tube into fluid-tight association with the seat member responsive to rotation of the nut in one direction, said sleeve equipped at its other end with a conical recess, a resilient split sleeve interposed at least in part between said unsplit sleeve and the nut flange and equipped spaced-apart surfaces tapered respectively differently than the surface of said recess and the inner flange surface, respectively, with its inner end surface engaged in said recess normally disposed in contact with a portion of the latter adjacent the bore thereof, and the outer periphery of its other tapered surface normally in contact with the outer peripheral portion of the opposed flange surface, whereby, upon rotation of said nut in the aforesaid direction, said split sleeve will be contracted radially to greatest degree at the end engaged in said recess and to a progressively decreasing degree toward its outer end and into clamping engagement with the tube at its first-named end, the shape of the bore of said tube being changed by the said flexing of said split sleeve to provide a progressively increasing space between the tube and split sleeve from the inner to the outer end of the latter.

8. A structure as defined in claim 7 wherein the bore of the split sleeve along the portion of same lying substantially between said tapered surfaces thereof is normally tapered and of greatest diameter at its innermost end and the remainder of the bore thereof is cylindrical, and wherein the said tapered bore portion is flexed to cylindrical form and engages the tube firmly while the normally cylindrical bore portion thereof becomes tapered and of greatest diameter at the outer extremity of said split sleeve.

9. A structure as defined in claim 7 wherein the split sleeve includes a tail portion of smaller diameter than the remainder thereof and which extends through the flanged end of the nut.

10. A structure as defined in claim 7 wherein the split sleeve is equipped with a single slot extending throughout the length thereof.

11. A structure as defined in claim 7 wherein the split sleeve is equipped with a tail portion of smaller diameter than the remainder thereof and which projects through the flanged end of the nut and is equipped with a normally cylindrical bore while the remainder of said split sleeve is equipped with a tapered bore flared to its inner end.

12. A structure as defined in claim 7 wherein the split sleeve is equipped with a tail portion of smaller diameter than the remainder thereof and which projects through the flanged end of the nut and is equipped with a normally cylindrical bore while the remainder of said split sleeve is equipped with a tapered bore flared to its inner end, and wherein said split sleeve is equipped with a single slot extending from end to end thereof.

IRVING COWLES.